(12) United States Patent
Lolley

(10) Patent No.: US 12,123,158 B2
(45) Date of Patent: Oct. 22, 2024

(54) RADON AND MOISTURE BARRIER FOR BUILDINGS

(71) Applicant: Advanced Building Products, Inc., Sanford, ME (US)

(72) Inventor: Keith A. Lolley, Sanford, ME (US)

(73) Assignee: Advanced Building Products, Inc., Sanford, ME (US)

( * ) Notice: Subject to any disclaimer, the term of this patent is extended or adjusted under 35 U.S.C. 154(b) by 290 days.

(21) Appl. No.: 17/667,054

(22) Filed: Feb. 8, 2022

(65) Prior Publication Data

US 2022/0251798 A1    Aug. 11, 2022

Related U.S. Application Data

(60) Provisional application No. 63/147,570, filed on Feb. 9, 2021.

(51) Int. Cl.
*E02D 31/00* (2006.01)
*B32B 5/02* (2006.01)
(Continued)

(52) U.S. Cl.
CPC ............ *E02D 31/008* (2013.01); *B32B 5/022* (2013.01); *B32B 5/028* (2013.01); *B32B 5/18* (2013.01); *B32B 5/273* (2021.05); *E02D 31/025* (2013.01); *E04B 1/7069* (2013.01); *E04B 1/7608* (2013.01); *E04B 1/80* (2013.01); *E04B 5/32* (2013.01); *B32B 2307/7246* (2013.01); *B32B 2419/00* (2013.01); *E02D 2450/106* (2013.01); *E02D 2450/107* (2013.01)

(58) Field of Classification Search
CPC ... E02D 31/008; E02D 31/025; E04B 1/7069; E04B 1/7608; E04B 1/80; E04B 5/32
See application file for complete search history.

(56) References Cited

U.S. PATENT DOCUMENTS

| 7,096,630 B1 * | 8/2006 | Keene | E04F 15/20 |
| | | | 52/302.1 |
| 8,146,310 B2 * | 4/2012 | Keene | E04F 15/182 |
| | | | 52/309.14 |

(Continued)

FOREIGN PATENT DOCUMENTS

WO    WO-9621931 A1 *  7/1996  ............. B32B 27/06

OTHER PUBLICATIONS

Office action issued in corresponding Canadian Application No. 3148110 (6 pages). (Year: 2023).*

(Continued)

*Primary Examiner* — Rodney Mintz
(74) *Attorney, Agent, or Firm* — Hammer & Associates, P.C.

(57) ABSTRACT

A radon gas and/or moisture abatement system (or method) is located under the concrete slab of a building. The system (or method) includes a multilayered mat having a first layer, a second layer, and a third layer sandwiched between the first layer and the second layer. The first layer is non-permeable and faces the concrete slab. The third (or sandwiched) layer is an entangled net. The second layer is permeable layer. The layers are bonded together. Whereby radon gas and/or moisture are inhibited from entering the building by passing through and collecting in the multilayer product.

14 Claims, 3 Drawing Sheets

(51) Int. Cl.
*B32B 5/18* (2006.01)
*B32B 5/26* (2006.01)
*E02D 31/02* (2006.01)
*E04B 1/70* (2006.01)
*E04B 1/76* (2006.01)
*E04B 1/80* (2006.01)
*E04B 5/32* (2006.01)

(56) References Cited

U.S. PATENT DOCUMENTS

| | | | | |
|---|---|---|---|---|
| 8,528,286 B2* | 9/2013 | Keene | ............... | B32B 5/26 |
| | | | | 52/145 |
| 8,544,218 B2* | 10/2013 | Dellinger | ............... | E04B 1/84 |
| | | | | 52/406.2 |
| 9,803,356 B2* | 10/2017 | Fox | ............... | E04B 1/62 |
| 10,563,033 B2* | 2/2020 | Nandi | ............... | C08J 9/125 |
| 10,724,231 B1* | 7/2020 | Treville | ............... | E04B 1/76 |
| 10,968,596 B2* | 4/2021 | Rudyan | ............... | B32B 27/32 |
| 11,142,880 B2* | 10/2021 | Rudyan | ............... | E02D 31/025 |
| 11,299,882 B2* | 4/2022 | Nandi | ............... | B32B 5/02 |
| 11,560,687 B2* | 1/2023 | Rudyan | ............... | B32B 5/024 |
| 11,745,465 B2* | 9/2023 | Vairo | ............... | E04B 1/80 |
| | | | | 52/309.6 |
| 2006/0053699 A1* | 3/2006 | Lolley | ............... | E04B 1/66 |
| | | | | 52/58 |
| 2009/0242325 A1* | 10/2009 | Dellinger | ............... | E04B 1/84 |
| | | | | 181/290 |
| 2010/0229486 A1* | 9/2010 | Keene | ............... | E04F 15/182 |
| | | | | 52/309.1 |
| 2011/0107700 A1* | 5/2011 | Keene | ............... | B32B 5/26 |
| | | | | 181/294 |
| 2014/0182221 A1* | 7/2014 | Hicks | ............... | E04B 1/80 |
| | | | | 52/169.11 |
| 2015/0376895 A1* | 12/2015 | Fox | ............... | E04B 1/62 |
| | | | | 52/302.3 |
| 2017/0022682 A1* | 1/2017 | Hicks | ............... | E04B 1/72 |
| 2017/0298637 A1* | 10/2017 | Keene | ............... | E04F 15/186 |
| 2019/0092917 A1* | 3/2019 | Nandi | ............... | C08G 18/4202 |
| 2019/0345713 A1* | 11/2019 | Lolley | ............... | E04B 1/80 |
| 2020/0173165 A1* | 6/2020 | Nandi | ............... | F16L 59/029 |
| 2020/0240101 A1* | 7/2020 | Rudyan | ............... | B32B 7/08 |
| 2020/0353716 A1* | 11/2020 | Vairo | ............... | B32B 5/32 |
| 2020/0370268 A1* | 11/2020 | Rudyan | ............... | B01D 71/06 |
| 2021/0372073 A1* | 12/2021 | Rudyan | ............... | B32B 7/12 |
| 2022/0356700 A1* | 11/2022 | Lolley | ............... | E04B 1/90 |

OTHER PUBLICATIONS

Ramvent Radon Abatemat Mat, Specification Bulletin No. 701, RAM Vent, Advanced Building Products, Inc., Sanford, ME; Aug. 2018.

* cited by examiner

RADON AND MOISTURE BARRIER FOR BUILDINGS

RELATED APPLICATION

This application claims the benefit of U.S. provisional patent application Ser. No. 63/147,570 filed Feb. 9, 2021, incorporated herein by reference.

FIELD OF THE INVENTION

The invention is directed to abatement of radon gas and moisture from entry into a building.

BACKGROUND OF THE INVENTION

Radon gas and moisture from the soil are concerns when constructing buildings, e.g., residential homes and commercial buildings. Radon gas and/or moisture should not infiltrate into the occupied space of the building. Both can penetrate a concrete slab, which often forms the base of such buildings.

Non-infiltration of radon gas and moisture is even more important currently because many homes are being built with in-home offices (required because of the pandemic).

In the past, Advanced Building Products, Inc. of Sanford, ME offered a product, RAMVENT™, a radon and moisture abatement mat, which is a multi-layered product that was placed under the concrete slab (i.e., placed prior to the concrete pour). The multi-layered product consisted of (from top-to-bottom): non-woven polyester filter fabric (permeable), a polymer matrix [also known as an entangled net (i.e., large denier filaments embossed with a pattern (e.g., dimples, corn-rowed, and the like)], and non-woven polyester filter fabric (permeable), see Advanced Building Products' Technical Bulletin No. 701 (dated 8/18), incorporated herein by reference. While this product has met many of the industry needs, improvement is always welcome.

Accordingly, an improved product is disclosed below.

SUMMARY OF THE INVENTION

A radon gas and/or moisture abatement system (or method) is located under the concrete slab of a building. The system (or method) includes a multilayered mat having a first layer, a second layer, and a third layer sandwiched between the first layer and the second layer. The first layer is non-permeable and faces the concrete slab. The third (or sandwiched) layer is an entangled net. The second layer is permeable layer. The layers are bonded together. Whereby radon gas and/or moisture are inhibited from entering the building by passing through and collecting in the multilayer product.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
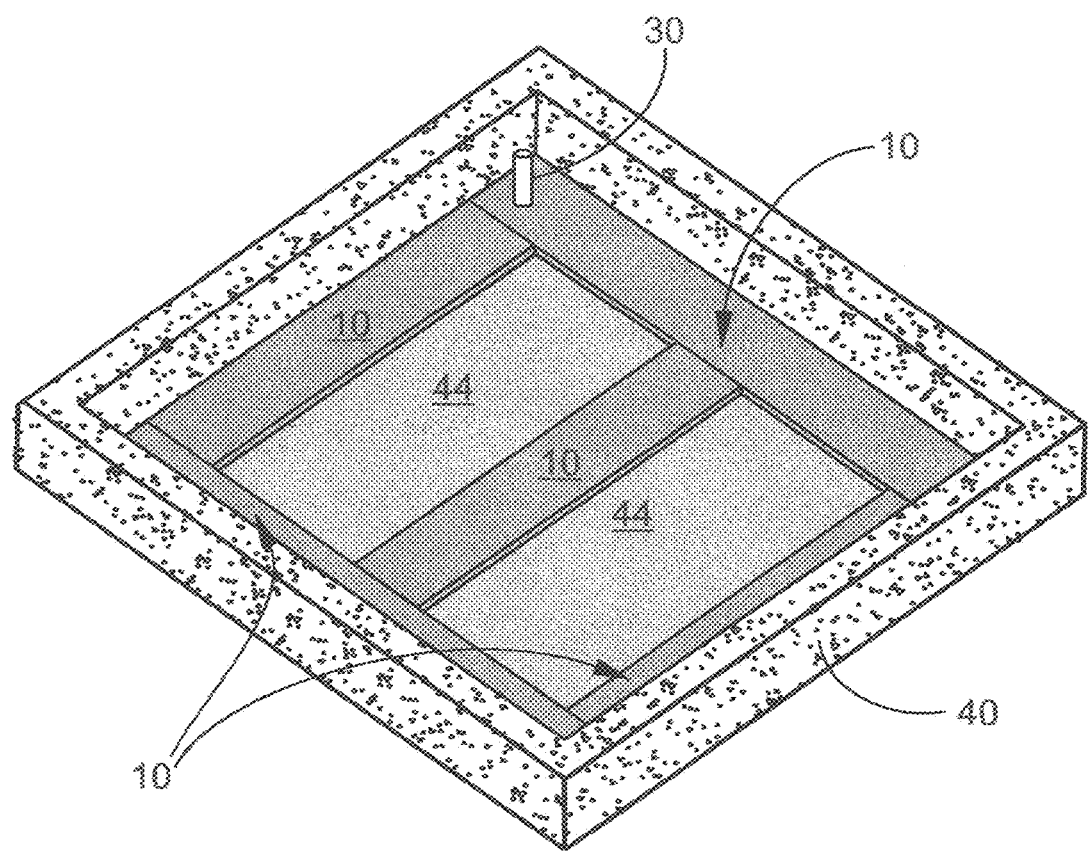
FIG. 1 illustrates an embodiment of the invention.

Referring to the drawings, several embodiments of the invention are illustrated.

Figure 3A:
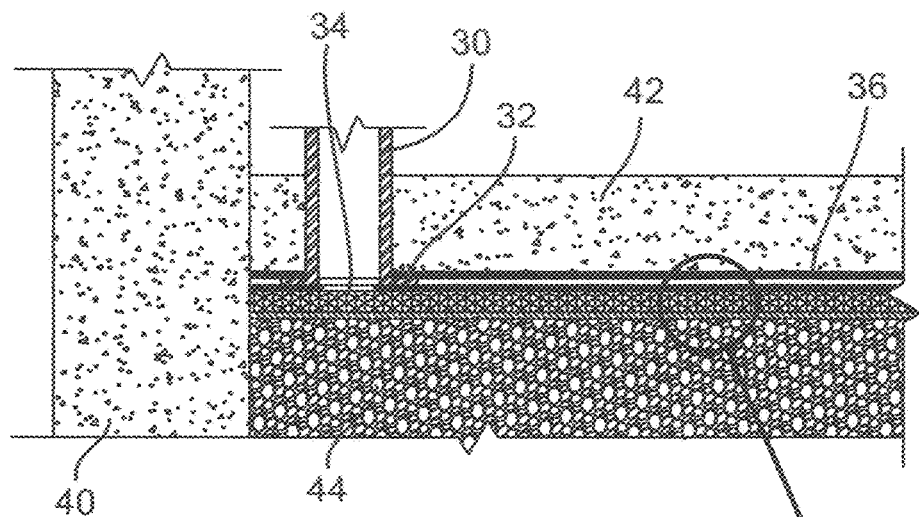
FIGS. 3A and 3B illustrate an embodiment of the invention.
Figure 4A:
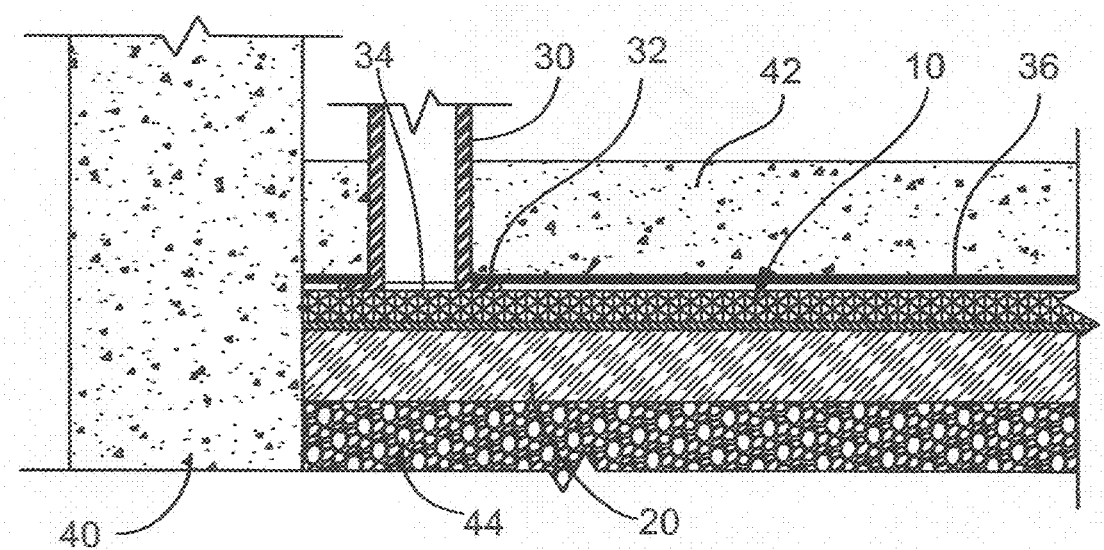
FIGS. 4A and 4B illustrate embodiments of the invention.
Figure 4B:
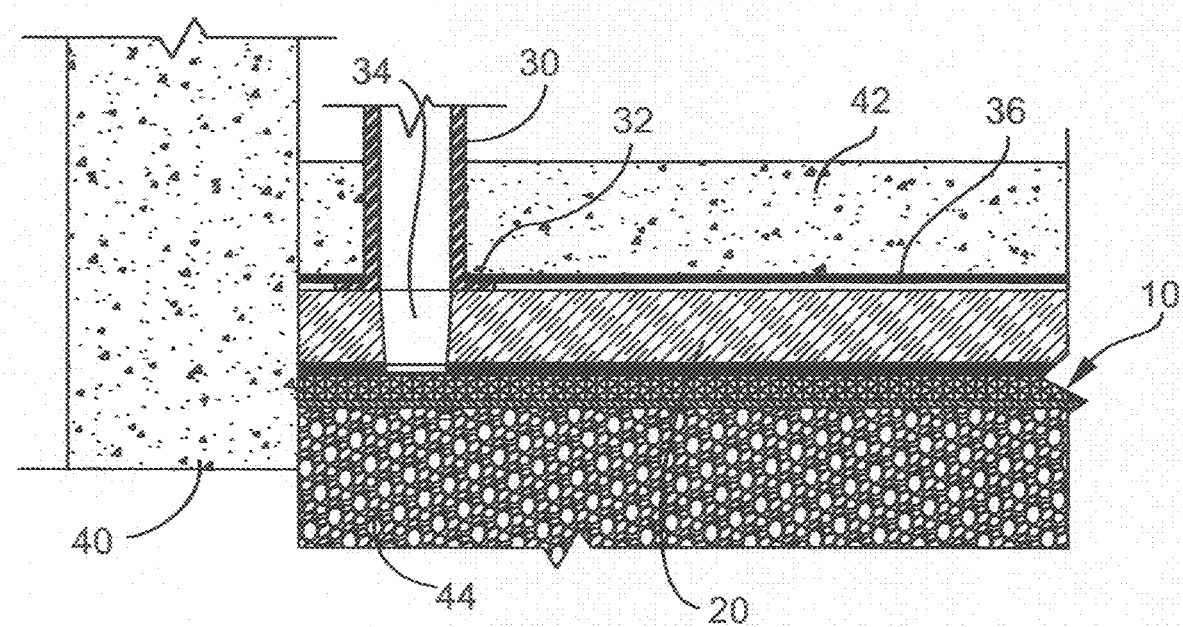

In general, the invention is a radon gas and/or moisture abatement system (or method) located under the concrete slab of a building (residential or commercial), see FIG. 1. An example of such a building, i.e., its foundation, is seen in FIGS. 1, 3A, 4A, and 4B, where a foundation wall 40 surrounds the perimeter of the building, concrete slab 42, see FIGS. 3A, 4A, and 4B, is located within the foundation wall 40, and dirt/gravel 44 is located beneath slab 42, from which radon gas and moisture originate, and the gravel may be placed therein by the contractor.

Figure 2:
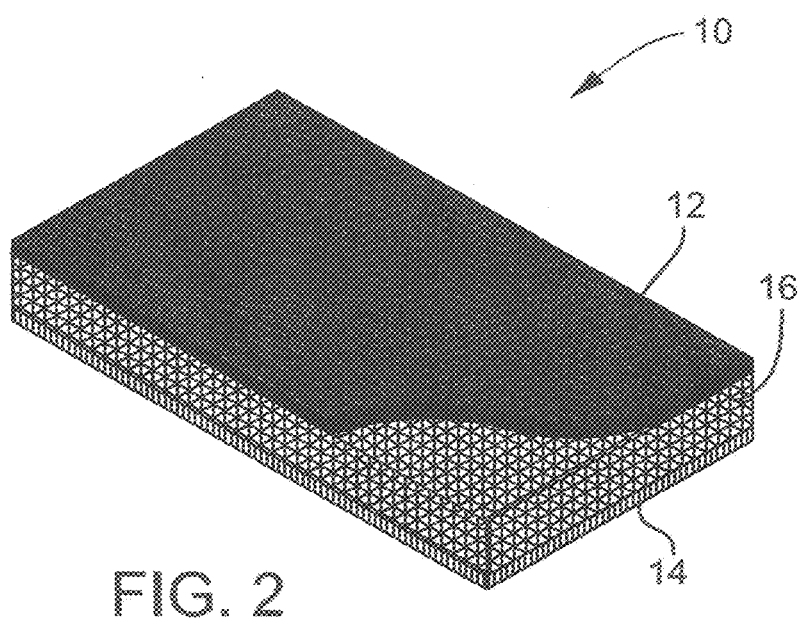
FIG. 2 illustrates an embodiment of an inventive multilayered product utilized in the invention.

This system (or method) includes: a multilayered product (mat) 10, see FIG. 2. The multilayered product 10 has a first layer 10, a second layer 12, and third layer 14 sandwiched between the first layer 10 and the second layer 14. The first layer 10 is non-permeable and faces the concrete slab. The third (or sandwiched) layer 16 is an entangled net. The second layer 14 is permeable layer. The layers may be co-extensive (meaning, for example, each layer has the generally same areal size, as shown in FIG. 2, but may include a flap, i.e., extension of the first or second layer, to facilitate placement) and are bonded together. Note FIG. 1, product 10 may be, but does not need to be co-extensive with the concrete slab or extent to the foundation wall. Instead, product 10 may only be under portions of the concrete slab. Product 10 may be provided as a roll good or flat sheet/panel.

First layer 10 is a non-permeable layer meaning that the layer blocks, or substantially blocks, the transmission of radon gas and/or moisture. Layer 10 is intended to block transmission of those materials and inhibit their transmission into the building, and facilitate redirection of those materials toward the vent 30 for removal. Layer 10 may be a film or nonwoven, so long as the layer meets its intended purpose. Nonwovens may be a spunbond nonwoven, meltblown nonwoven, and/or a combination of meltblown and spunbond nonwovens. The nonwoven may be made of thermoplastic materials. These thermoplastic materials may include polypropylene, nylon (e.g., nylon 6), and/or polyethylene (e.g., HDPE).

Figure 3B:
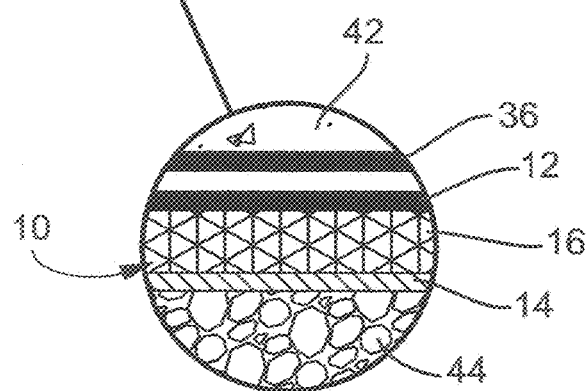

Second layer 16 is an entangled net. The second layer 16 facilitates movement of radon gas and moisture (water) within the product 10, so that radon gas and moisture (water) may escape, for example, through vent 30, see FIGS. 1, 3A, 4A and 4B. Entangled nets are known and may be in either of two general forms: 1) a solid formed of a plurality of entangled fibers (filaments or continuous fibers), for example see U.S. Pat. Nos. 7,096,630, 8,146,310, and 8,544,218 (such as a scrubbing pad); or 2) a sheet of entangled fibers (filaments or continuous fibers) where the sheet is molded or folded (e.g., forming, for example, a sine curve (or corn rows) in cross-section (also referred to as 'channels'), or 'peaks and furrows' (or 'W')) (also referred to as 'channels'), or dimpled or waffle (e.g., cone-shaped, pyramidal-shaped including truncated cones or pyramids, for example see FIG. 3—truncated pyramids 3) to create a three-dimensional solid, for example see U.S. Pat. No. 8,528,286. Entangled nets are known, for example see U.S. Pat. No. 7,096,630, US200610230699; U.S. Pat. Nos. 8,146,310; 8,544,218; and 8,528,286, each incorporated herein by reference. In general, the fibers of the entangled net create an open solid (open in the sense of the interstitial spaces between the fibers). The entangled net may be made of thermoplastic materials. These thermoplastic materials may include polypropylene, nylon (e.g., nylon 6), and/or polyethylene (e.g., HDPE). The entangled net may have a thickness in the range of about 3-20 mm (including all subsets of the range).

Third layer 14 is a permeable layer meaning it allows the transmission of radon gas and moisture. Layer 14 may be a nonwoven, so long as the layer meets its intended purpose. Nonwovens may be a spunbond nonwoven, meltblown nonwoven, and/or a combination of meltblown and spunbond nonwovens. The nonwoven may be made of thermoplastic materials. These thermoplastic materials may include polypropylene, nylon (e.g., nylon 6), and/or polyethylene (e.g., HDPE).

Bonded together, as used herein, refers to layers of product 10 being joined together into a unitary structure by bonding of the first layer to a surface of the middle layer and the second layer to another surface of the middle layer. Such bonding may be autogenous or with adhesives. The adhesives may be applied to the entire surface of the layer or in a plurality of strips across the surface of the layer or scatter coated across the surface.

The system (or method) may also include, as mentioned above, a vent 30 that extends through the slab 42, see FIGS. 1, 3A, 4A, and 4B. The vent 30 facilitates the removal of radon gas and/or moisture. The vent 30 may be, for example, generally hollow with a flange 32 for engagement with the product 10. During installation, vent 30 is placed in contact with product 10 and then a piece of the layer 10 is removed to from a vent cut-out 34, through which the radon gas and moisture may escape. Thereafter, the flange is secured to the product in any conventional manner, e.g., adhesive. The vent may be capped.

The system (or method) may also include an optional discrete vapor barrier 36 located between the concrete slab 42 and the multilayered product 10. See FIGS. 3A, 3B, 4A, and 4B. Vapor barrier 36 may be conventional 'house wrap.' House wrap is a term of art recognized by those of ordinary skill. Such housewraps are made of, for example, polyvinyl chloride (PVC); polyethylene (PE); polypropylelne (PP), including multi-layered PP; polyolefin, e.g., StegoWrap; and polymer modified asphalt.

The system (or method) may also include a rigid foam insulation (and rigid foam board) 20 located between the concrete slab 42 and the multilayered product 10, see FIG. 4A, or a rigid foam insulation (or rigid foam board) 20 located below the multilayered product 10 which is adjacent the concrete slab 42, see FIG. 4B. Rigid foam insulation and rigid foam board are terms of art recognized by those of ordinary skill.

In operation, the foundation is dug, and the footing and foundation walls are set. If necessary or desired, gravel may be placed within the foundation walls for facilitate drainage and/or collection of radon gas and/or moisture. The multilayered product is set within the perimeter walls of the foundation. The product may cover the entire area within the foundation walls or only a portion of that area. As desired, or needed, the forementioned vapor barrier and/or rigid foam insulation or board may be set. The vent is placed, vent cut-out(s) are made, and then the vent is secured to the product. The concrete slab is poured. Radon gas and/or moisture seeping from the dirt and gravel below the slab travels through the product (mat) where it may reside, for a time, until it is removed (or escapes) via the vent.

The present invention may be embodied in other forms without departing from the spirit and the essential attributes thereof, and, accordingly, reference should be made to the appended claims, rather than to the foregoing specification, as indicated the scope of the invention.

I claim:

1. A radon gas and moisture abatement system located under a concrete slab of a building comprises:
    a multilayered mat having a first layer, a second layer, and a third layer, the second layer being sandwiched between the first layer and the third layer, the first layer is non-permeable to transmission of radon gas and moisture and faces a bottom surface of the concrete slab, the second layer is an entangled net consisting of thermoplastic fibers creating an open solid with interstitial spaces between the thermoplastic fibers, and the third layer is permeable to the transmission of radon gas and moisture, the layers are bonded together to form a unitary structure,
    a rigid foam product located between or below the concrete slab and the multilayered mat,
    wherein said radon gas and moisture are inhibited from entering the building by passing through and collecting in the multilayered mat.

2. The system according to claim 1 further comprises a vent pipe through the concrete slab and in communication with the multilayered mat for removal of said radon gas and moisture from below the concrete slab.

3. The system according to claim 1 wherein the rigid foam product is a rigid foam insulation or board located between the concrete slab and the multilayered mat.

4. The system according to claim 1 wherein the rigid foam product is a rigid foam insulation or board located below the multilayered mat which is adjacent the concrete slab.

5. The system according to claim 1 further comprises a discrete vapor barrier located between the concrete slab and the multilayered mat.

6. The system according to claim 5 wherein the rigid foam product is a rigid foam insulation or board located between the discrete vapor barrier and the concrete slab, and the multilayered mat is located below the discrete vapor barrier.

7. The system according to claim 5 wherein the rigid foam product is a rigid foam insulation or board located above the multilayered mat and below the discrete vapor barrier.

8. A method of abating radon gas and moisture intrusion into a building comprises the steps of:
    placing a multilayered mat below a concrete slab of the building, the mat having a first layer, a second layer, and a third layer, the second layer being sandwiched between the first layer and the third layer, the first layer is non-permeable to transmission of radon gas and moisture and faces a bottom surface of the concrete slab, the second layer is an entangled net consisting of thermoplastic fibers creating an open solid with interstitial spaces between the thermoplastic fibers, and the third layer is permeable to the transmission of radon gas and moisture, the layers are bonded together to form a unitary structure,
    placing a rigid foam product between or below the concrete slab and the multilayered mat,
    wherein said radon gas and moisture are inhibited from entering the building by passing through and collecting in the multilayered mat.

9. The method according to claim 8 further comprises placing a vent pipe through the concrete slab and in communication with the multilayered mat for removal of said radon gas and moisture from below the concrete slab.

10. The method according to claim 8 wherein the rigid foam product is a rigid foam insulation or board between the concrete slab and the multilayered mat.

11. The method according to claim 8 wherein the rigid foam product is a rigid foam insulation or board below the multilayered mat which is adjacent the concrete slab.

12. The method according to claim 8 further comprises placing a discrete vapor barrier between the concrete slab and the multilayered mat.

13. The method according to claim 12 wherein the rigid foam product is a rigid foam insulation or board between the discrete vapor barrier and the concrete slab, and the multilayered mat is located below the discrete vapor barrier.

14. The method according to claim 12 wherein the rigid foam product is a rigid foam insulation or board above the multilayered mat and below the discrete vapor barrier.

* * * * *